UNITED STATES PATENT OFFICE.

GUSTAV HARTMANN, OF MUNICH, GERMANY.

PROCESS OF PRODUCING PEAT BRIQUETS.

SPECIFICATION forming part of Letters Patent No. 714,578, dated November 25, 1902.

Application filed June 10, 1901. Serial No. 64,005. (No specimens.)

*To all whom it may concern:*

Be it known that I, GUSTAV HARTMANN, a citizen of Germany, residing at Munich, in the Empire of Germany, have invented certain new and useful Improvements in Processes of Producing Peat Briquets; and I do hereby declare the following to be a full, clear, and exact description of the invention, such as will enable others skilled in the art to which it appertains to make and use the same.

My invention relates to an improved process for the production of peat briquets.

The object of my invention is to produce peat briquets having a higher heat value than has heretofore been obtained by prior processes.

With this general object in view and some others which will be obvious to those skilled in the art my improved process consists in the steps hereinafter described, and particularly pointed out in the claims.

In carrying out my process I take freshly-dug peat and dry the same by a mild heat until the material has but about twenty per cent. of moisture remaining in it. This air-dried peat is then comminuted, preferably by grinding it to a fine powder. This powder is then roasted in open vessels, whereby access of air is permitted to the material being roasted, the temperature being first raised to about 110° centigrade, until the material has been completely dried, whereupon the temperature is then raised to about 220° centigrade. At 130° centigrade a partial decomposition of the organic constituents of the material takes place, the easily volatile ingredients being driven off, while the heavier or rather less easily volatile tar-like products, which possess a high heat value, remain in the powdered material. The roasting process is continued for about thirty to forty minutes, and at the end of that time there is obtained a product which contains about seventy per cent. carbon and has a heating value of about six thousand calories. The roasted material is then subjected to a high pressure in suitable molds for the purpose of forming it into briquets of the desired form.

It is to be noted that the method of roasting employed by me differs from those methods of roasting heretofore employed in the production of peat briquets in that in the old ways of roasting the material is subjected to a high temperature in closed vessels, whereby it results that substantially all the organic constituents are decomposed and all the products of decomposition are driven off, which necessitates that after the completion of such roasting process a suitable binding material, such as tar, must be added to the carbonized peat in order to permit the formation of the latter into briquets. On the other hand, by my process the tar-like constituents are not destroyed or driven off, but are retained and serve not only as a binding material for the formation of the briquets, but also as a source of heat when the peat briquets are afterward employed as fuel.

In order to make clear the considerable enhancement of the heating value of the product obtained by my improved process, I give herewith an analysis of the raw material and of the finished briquet, viz:

| Air-dried peat. | | Finished briquet. | |
|---|---|---|---|
| | *Per cent.* | | *Per cent.* |
| Carbon | 48.58 | Carbon | 63.97 |
| Hydrogen | 5.37 | Hydrogen | 5.53 |
| Oxygen and nitrogen | 30.04 | Oxygen and nitrogen | 21.84 |
| Ash | 3.64 | Ash | 5.10 |
| Water | 12.37 | Water | 3.56 |

Heating value of one kilogram of the air-dried peat equals four thousand three hundred and twenty-seven calories.

Heating value of one kilogram of the finished briquets made by my process equals five thousand nine hundred and sixty-seven calories.

The above-described new process, in addition to the advantage of producing a product of higher heating value than heretofore, has the additional advantage that it requires less time and less fuel for the roasting of the peat-powder.

While, as above stated, I find it preferable to reduce the peat to a powder, it should be observed that it is not indispensably necessary to comminute or divide the same to such an extent in carrying out my invention, other ways of comminution or division—for example, into a granular or lump form—being also productive of good results.

Having thus fully described my invention, what I claim as new, and desire to secure by Letters Patent, is—

1. The process for the production of peat briquets, which consists in gradually heating comminuted peat in a loose condition to a temperature of 220°, centigrade, while permitting the free access of air to said material.

2. The process for the production of peat briquets, which consists in first partially drying the peat, next comminuting the same, and then gradually heating the comminuted material to a temperature of 220°, centigrade, in the presence of air.

3. The process for the production of peat briquets, which consists in first partially drying the peat at a mild heat until only about twenty per cent. of the moisture remains, next grinding the material to a powder, then heating the powdered material to a temperature of 220° centigrade, in the presence of air, and finally subjecting the material to pressure to form briquets.

4. The process of producing peat briquets, which consists in air-drying the natural peat until about twenty per cent. of the moisture remains therein, then comminuting or dividing the same, then completing the drying of the peat by raising the temperature to about 110°, centigrade, with access of air, and finally raising the temperature to substantially 220°, centigrade, also in the presence of air.

In testimony whereof I affix my signature in presence of two witnesses.

GUSTAV HARTMANN.

Witnesses:
 RUDOLPH W. HIOBL,
 ANNIE WIMBAUR.